(12) United States Patent
Tanabe et al.

(10) Patent No.: US 11,299,044 B2
(45) Date of Patent: Apr. 12, 2022

(54) VEHICLE SEAT

(71) Applicant: TS TECH CO., LTD., Saitama (JP)

(72) Inventors: Jinichi Tanabe, Tochigi (JP); Kenichi Niitsuma, Tochigi (JP); Hidetoshi Ozawa, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 34 days.

(21) Appl. No.: 16/623,998

(22) PCT Filed: Jun. 13, 2018

(86) PCT No.: PCT/JP2018/022627
§ 371 (c)(1),
(2) Date: Dec. 18, 2019

(87) PCT Pub. No.: WO2018/235699
PCT Pub. Date: Dec. 27, 2018

(65) Prior Publication Data

US 2020/0198465 A1    Jun. 25, 2020

(30) Foreign Application Priority Data

Jun. 20, 2017    (JP) .............................. JP2017-120587

(51) Int. Cl.
| | |
|---|---|
| *B60K 28/06* | (2006.01) |
| *B60N 2/75* | (2018.01) |
| *B60N 2/14* | (2006.01) |
| *B60W 40/08* | (2012.01) |
| *B60W 50/16* | (2020.01) |

(Continued)

(52) U.S. Cl.
CPC ............ *B60K 28/066* (2013.01); *B60N 2/143* (2013.01); *B60N 2/75* (2018.02); *B60W 40/08* (2013.01);

(Continued)

(58) Field of Classification Search
CPC ........ B60K 28/066; B60N 2/75; B60N 2/143; B60N 2002/981; B60W 40/08;

(Continued)

(56) References Cited

U.S. PATENT DOCUMENTS

| | | | |
|---|---|---|---|
| 6,392,550 B1 * | 5/2002 | Najor ....................... | A61B 5/18 340/439 |
| 10,744,906 B2 * | 8/2020 | Sugioka ................ | B60N 2/919 |

(Continued)

FOREIGN PATENT DOCUMENTS

| | | |
|---|---|---|
| JP | H06171391 | 6/1994 |
| JP | 2007055321 | 3/2007 |

(Continued)

OTHER PUBLICATIONS

International Search Report for PCT/JP2018/0226267 dated Aug. 17, 2018, 4 pages.

*Primary Examiner* — Mohamed Barakat
(74) *Attorney, Agent, or Firm* — Dority & Manning, P.A.

(57) ABSTRACT

Provided is a vehicle seat that detects an alertness level of the driver, urges the driver to be alert, and permits the transition from autonomous driving to manual driving when the driver is alert enough for the manual driving. A vehicle seat (1) configured to be mounted on a vehicle (3) provided with a vehicle control device (5) that can be selectively switched from autonomous driving to manual driving comprises: a seat body (7) configured to support a driver; a seat control unit (10) configured to communicate with the vehicle control device; an alertness level sensor (8) provided on the seat body for detecting an alertness level of the driver; and a rousing unit (9) provided on the seat body for providing a stimulus for urging the driver to be roused, wherein the seat control unit is configured to detect the alertness level of the driver according to a signal from the alertness level sensor upon receiving a start signal that is produced by the vehicle (Continued)

control device when a transition from the autonomous driving to the manual driving is to be initiated, to activate the rousing unit when the alertness level is lower than a first alertness level threshold value, and to permit the vehicle control device to perform the transition from the autonomous driving to the manual driving when the alertness level is equal to or higher than the first alertness level threshold value.

10 Claims, 6 Drawing Sheets

(51) Int. Cl.
*B60N 2/90* (2018.01)
*B60W 50/14* (2020.01)

(52) U.S. Cl.
CPC ....... *B60W 50/16* (2013.01); *B60N 2002/981* (2018.02); *B60W 2040/0827* (2013.01); *B60W 2040/0872* (2013.01); *B60W 2050/143* (2013.01)

(58) Field of Classification Search
CPC ......... B60W 50/16; B60W 2040/0827; B60W 2040/0872; B60W 2050/143
See application file for complete search history.

(56) References Cited

U.S. PATENT DOCUMENTS

| | | | |
|---|---|---|---|
| 2009/0099721 A1 | 4/2009 | Imai et al. | |
| 2014/0104405 A1* | 4/2014 | Weidl | G06K 9/00845 348/77 |
| 2016/0033964 A1* | 2/2016 | Sato | B60K 28/06 701/24 |
| 2016/0041553 A1* | 2/2016 | Sato | B60W 30/143 701/23 |
| 2016/0159370 A1* | 6/2016 | Muramatsu | B60W 50/14 701/1 |
| 2016/0246298 A1* | 8/2016 | Sato | B60Q 5/005 |
| 2018/0154903 A1* | 6/2018 | Song | B60W 50/12 |
| 2018/0194194 A1* | 7/2018 | Lyubich | B60N 2/5628 |

FOREIGN PATENT DOCUMENTS

| | | | |
|---|---|---|---|
| JP | 2008120271 | | 5/2008 |
| JP | 2008120271 A | * | 5/2008 |
| JP | 2016034782 | | 3/2016 |
| JP | 2016038768 | | 3/2016 |
| JP | 2016110336 | | 6/2016 |
| JP | 2016153960 | | 8/2016 |

* cited by examiner

VEHICLE SEAT

CROSS REFERENCE TO RELATED APPLICATIONS

This application is the U.S. National Stage entry of International Application Number PCT/JP2018/022627 filed under the Patent Cooperation Treaty having a filing date of Jun. 13, 2018, which claims priority to Japanese Patent Application No. 2017-120587 having a filing date of Jun. 20, 2017, which are incorporated herein by reference.

TECHNICAL FIELD

The present invention relates to a vehicle seat mounted on a vehicle which is capable of autonomous driving.

BACKGROUND ART

In a known vehicle driving control system for a vehicle which automatically follows a preceding vehicle while the driver performs a manual steering operation, the driver's alertness level is detected based on the time change in the steering angle of the steering wheel operated by the driver, and a warning is given to the driver when the alertness level of the driver falls below a predetermined level (see Patent Document 1, for instance). According to the vehicle driving control system disclosed in Patent Document 1, a prescribed number of warnings are issued to the driver in an attempt to rouse the driver, and if the driver's alertness level is still below the predetermined level, the adaptive cruising control is prohibited so that the driver's alertness may be regained, and the driver may be enabled to perform the steering operation.

PRIOR ART DOCUMENT(S)

Patent Document(s)

Patent Document 1: JPH06-171391A

SUMMARY OF THE INVENTION

Task to be Accomplished by the Invention

However, according the vehicle driving control system of Patent Document 1, even after the prescribed number of warnings are issued, the driver may still not be alert enough to properly operate the steering wheel. In the case of a vehicle capable of autonomous driving, it is necessary to correctly determine the driver's alertness level because the transition from the autonomous driving to the manual driving while the driver is not fully alert may be hazardous. In this conjunction, the vehicle seat may be expected as a promising platform for accurately detecting the alertness of the driver since the vehicle seat is in physical contact with the driver.

In view of such background, an object of the present invention is to provide a vehicle seat that can detect an alertness level of the driver, and urge the driver to be alert enough for the transition from autonomous driving to manual driving to be performed in a safe manner.

Means for Accomplishing the Task

To achieve the above object, a vehicle seat (1) configured to be mounted on a vehicle (3) provided with a vehicle control device (5) that can be selectively switched from autonomous driving to manual driving, comprises: a seat body (7) configured to support a driver; a seat control unit (10) configured to communicate with the vehicle control device; an alertness level sensor (8) provided on the seat body for detecting an alertness level of the driver; and a rousing unit (9) provided on the seat body for providing a stimulus for urging the driver to be roused; wherein the seat control unit is configured to detect the alertness level of the driver according to a signal from the alertness level sensor upon receiving a start signal that is produced by the vehicle control device when a transition from the autonomous driving to the manual driving is to be initiated, to activate the rousing unit when the alertness level is lower than a first alertness level threshold value, and to permit the vehicle control device to perform the transition from the autonomous driving to the manual driving when the alertness level is equal to or higher than the first alertness level threshold value.

According to this aspect, the transition to the manual driving is permitted when the driver's alertness level has been raised to a sufficiently high level, and therefore, the transition of the vehicle from the autonomous driving to the manual driving can be carried out safely.

In the above aspect, preferably, the seat control unit is configured to prohibit the transition from the autonomous driving to the manual driving by the vehicle control device and to keep the rousing unit activated when the start signal is received as long as the alertness level is lower than the first alertness level threshold value.

According to this aspect, when the alertness level of the driver is detected and the detected alertness level is low, a stimulus is given to the driver to rouse the driver and the transition from the autonomous driving to the manual driving is prohibited, whereby the transition from the autonomous driving to the manual driving can be carried out safely.

In the above aspect, preferably, the seat control unit is configured to change at least one of an intensity, a time duration, a cyclic period and a timing of the stimulus in dependence on the alertness level.

According to this aspect, the stimulus for urging the driver to be roused can be given to the driver in an appropriate manner.

In the above aspect, preferably, the alertness level sensor includes at least one of a pulse sensor (21), a respiration sensor (22) and a pressure sensor (23) configured to detect a pressure distribution on a surface of the seat body opposing the driver.

According to this aspect, the alertness level of the driver can be detected in an appropriate manner.

In the above aspect, preferably, the alertness level sensor includes a brainwave sensor (24) provided on a part of the seat body opposing a head of the driver.

According to this aspect, the alertness level of the driver can be detected in an appropriate manner.

In the above aspect, preferably, the seat control unit is configured to compute a sleep level of the driver including a distinction between a REM sleep and a non-REM sleep based on an output from the alertness level sensor when the alertness level is lower than a second alertness level threshold value which is lower than the first alertness level threshold value, and to change the stimulus provided to the driver according to the computed sleep level.

According to this aspect, by giving a stimulus corresponding to the sleep level to the driver, the regaining of the alertness of the driver can be facilitated.

In the above aspect, preferably, the seat control unit is configured to receive a signal predicting a time of the transition from the autonomous driving to the manual driving from the vehicle control device, and to activate the rousing unit in advance of the predicted time of the transition by a prescribed time period.

According to this aspect, an adequate time period for the driver to be roused can be ensured.

In the above aspect, preferably, the seat control unit is configured to forward a vehicle stop signal to the vehicle control device when the seat control unit detects that the alertness level has continued to be below the first alertness level threshold value for a prescribed time period when the start signal is received.

According to this aspect, the vehicle can be stopped when the driver cannot be expected to be brought alert enough for manual driving.

In the above aspect, preferably, the rousing unit includes at least one of a light source (31) configured to irradiate light to the driver, a vibration source (32) configured to provide vibration to the driver, a sound source (33) configured to generate sound, a heat source (34) configured to heat or cool at least a part of the driver's body, and an electrical stimulus generating source (35) configured to apply an electrical stimulus to the driver.

According to this aspect, the stimulus for urging the driver to be roused can be given to the driver in an appropriate manner.

In the above aspect, preferably, the seat body is mounted on a vehicle body so as to be moveable between an autonomous driving position and a manual driving position, a drive unit (50) for moving the seat body between the autonomous driving position and the manual driving position is provided between the seat body and the vehicle body, and the rousing unit is configured to cause the drive unit to move the seat body from the autonomous driving position to the manual driving position as the stimulus.

According to this aspect, by moving the seat to a position suitable for the manual driving, the stimulus for urging the driver to be roused is given to the driver.

In the above aspect, preferably, the vehicle seat further includes an armrest (61) which is moveable relative to the seat body, and the rousing unit is configured to cause the armrest to move as the stimulus.

According to this aspect, the armrest can be brought to a position suitable for the manual driving, and the stimulus that urges the driver to regain alertness can be given to the driver by the movement of the armrest.

In the above aspect, preferably, the seat body is mounted on the vehicle body so as to be rotatable around a vertical axial line, and the seat control unit is configured to allow the seat body to be rotated in the autonomous driving position and to place the seat body relative to the vehicle body to face forward in the manual driving position.

According to this aspect, the vehicle occupants can be seated to face one another during the autonomous driving by moving the seat body. Further, at the time of transition to the manual driving, the seat body is moved to a position suitable for the manual driving, whereby the stimulus to urge the driver to be alert can be given to the driver.

Effect of the Invention

Owing to the structures mentioned above, it is possible to provide a vehicle seat that can detect the alertness level of the driver and urge the driver to be alert so that the vehicle can be safely transitioned from the autonomous driving to the manual driving.

In one aspect of the present invention, when the alertness level of the driver is detected and the detected alertness level is low, a stimulus is given to the driver to rouse the driver the transition from the autonomous driving to the manual driving is prohibited, whereby the vehicle can be safely transitioned from the autonomous driving to the manual driving.

In one aspect of the present invention, the alertness level sensor includes at least one of a pulse sensor, a respiration sensor and a pressure sensor configured to detect a pressure distribution on a surface of the seat body opposing the driver, whereby the alertness level of the driver can be detected in an appropriate manner.

In one aspect of the present invention, the alertness level sensor includes a brainwave sensor provided on a part of the seat body opposing a head of the driver, whereby the alertness of the driver can be detected in an appropriate manner.

In one aspect of the present invention, the seat control unit is configured to compute a sleep level of the driver including a distinction between a REM sleep and a non-REM sleep based on an output from the alertness level sensor when the alertness level is lower than a second alertness level threshold value which is lower than the first alertness level threshold value, and to change the stimulus provided to the driver according to the computed sleep level, whereby a stimulus corresponding to the sleep level can be given to the driver, and the regaining of the alertness of the driver can be facilitated.

In one aspect of the present invention, the seat control unit is configured to receive a signal predicting a time of the transition from the autonomous driving to the manual driving from the vehicle control device, and to activate the rousing unit in advance of the predicted time of the transition by a prescribed time period, whereby an adequate time period required for the driver to be properly roused can be ensured.

In one aspect of the present invention, the seat control unit is configured to forward a vehicle stop signal to the vehicle control device when the seat control unit detects that the alertness level has continued to be below the first alertness level threshold value for a prescribed time period when the start signal is received, whereby the vehicle can be stopped when the alertness level of the driver cannot be expected to be adequately regained.

In one aspect of the present invention, the rousing unit includes at least one of a light source configured to irradiate light to the driver, a vibration source configured to provide vibration to the driver, a sound source configured to generate sound, a heat source configured to heat or cool at least a part of the driver's body, and an electrical stimulus generating source configured to apply an electrical stimulus to the driver, whereby the stimulus for urging the driver to be roused can be given to the driver in an appropriate manner.

In one aspect of the present invention, the seat body is mounted on a vehicle body so as to be moveable between an autonomous driving position and a manual driving position, a drive unit for moving the seat body between the autonomous driving position and the manual driving position is provided between the seat body and the vehicle body, and the rousing unit is configured to cause the drive unit to move the seat body from the autonomous driving position to the manual driving position as the stimulus, whereby the stimulus for urging the driver to be roused is given to the driver.

In one aspect of the present invention, the vehicle seat further includes an armrest which is moveable relative to the seat body, and the rousing unit is configured to cause the armrest to move as the stimulus, whereby the armrest can be brought to a position suitable for the manual driving, and the stimulus that urges the driver to regain alertness can be given to the driver by the movement of the armrest.

In one aspect of the present invention, the seat body is mounted on the vehicle body so as to be rotatable around a vertical axial line, and the seat control unit is configured to allow the seat body to be rotated in the autonomous driving position and to place the seat body relative to the vehicle body to face forward in the manual driving position, whereby the vehicle occupants can be seated to face one other by moving the seat body. Further, at the time of transition to the manual driving, the seat body is moved to a position suitable for the manual driving, whereby the stimulus to urge the driver to be alert can be given to the driver.

BRIEF DESCRIPTION OF THE DRAWING(S)

MODE(S) FOR CARRYING OUT THE INVENTION

Four embodiments of a vehicle seat according to the present invention are described in the following with reference to FIGS. 1 to 6.

First Embodiment

Figure 1:
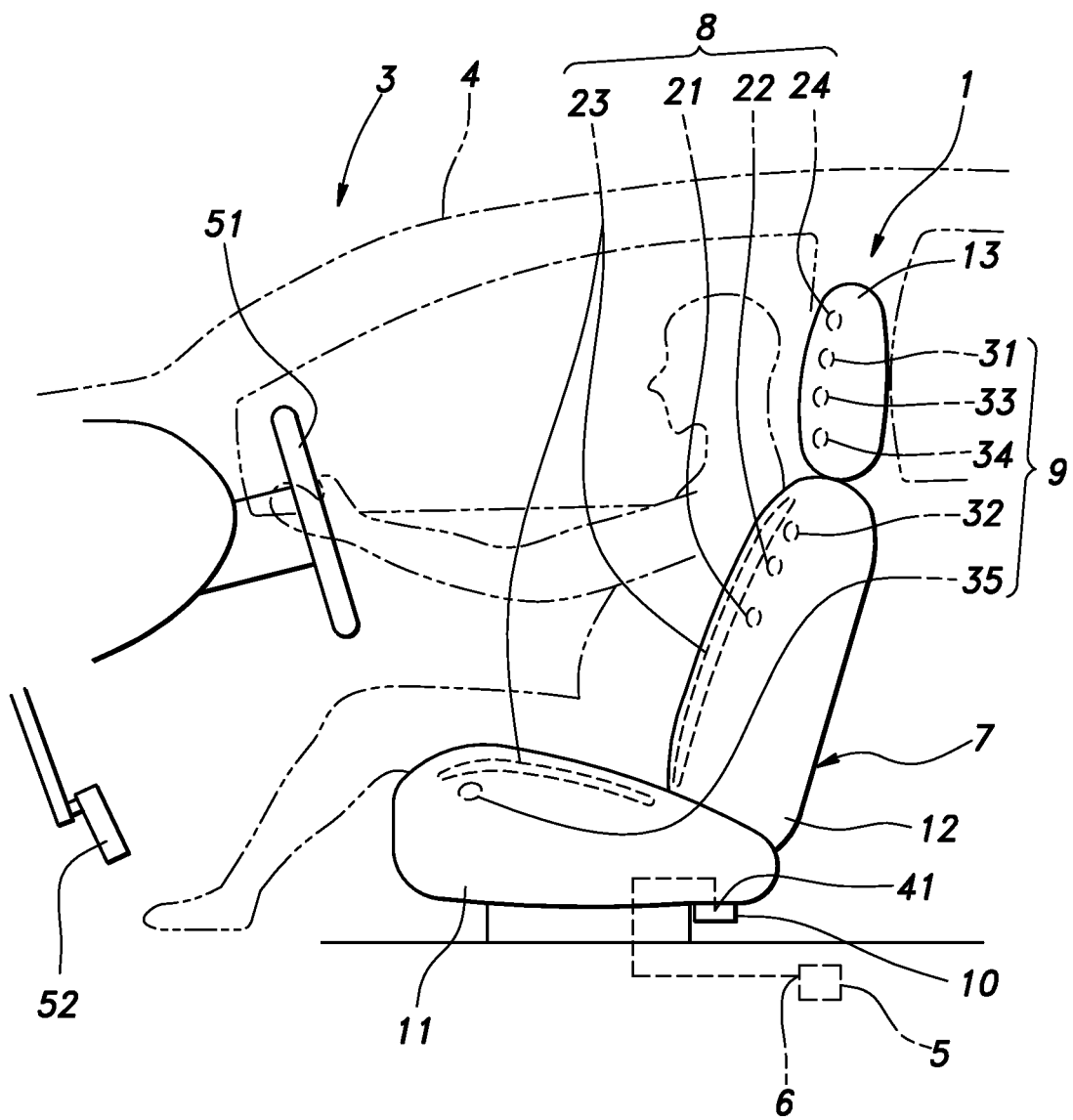
FIG. 1 is a schematic view of a vehicle seat according to an embodiment of the present invention.

A vehicle seat 1 according to the present invention seats a driver, and is mounted on a vehicle capable of autonomous driving as shown in FIG. 1. A lower part of the vehicle body 4 of the vehicle 3 is fitted with a vehicle control device 5 that allows the vehicle 3 to transition from autonomous driving to manual driving by determining the condition of the vehicle 3 and the condition of the surrounding environment. The vehicle control device 5 consists of a central processing unit (CPU) provided with memory and a communication port 6 for forwarding and receiving signals, and is configured to issue a start signal from the communication port 6 when the transition from the autonomous driving to the manual driving of the vehicle 3 is initiated. Furthermore, the vehicle control device 5 is configured to autonomously drive the vehicle to a prescribed safe area (such as a service area and a parking lot) and park the vehicle when a vehicle stop signal is received via the communication port 6.

The vehicle seat 1 is provided with a seat body 7 that can be moved relative to the vehicle body 4. The seat body 7 is provided with a seat cushion 11 that supports the driver's buttocks and thighs, a seatback 12 that supports the driver's back, and a headrest 13 connected to an upper part of the seatback 12 so as to be positioned behind the driver's head.

The vehicle seat 1 is provided with an alertness level sensor 8 that is positioned on the seat body 7 to detect the driver's alertness level. The alertness level sensor 8 includes any one of a pulse sensor 21, a respiration sensor 22, a pressure sensor 23, and a brainwave sensor 24. The pulse sensor 21 is provided on the front surface of the seatback 12, and is preferably disposed at a position corresponding to the driver's heart. The pulse sensor 21 may consist of a sensor that counts the number of heartbeats or pulses of the driver within a predetermined time (heart rate), and may be based on any type such as a contact type, optical type, and an electrocardiographic type. The respiration sensor 22 may consist of a sensor that detects the respiration rate and respiration depth of the driver. The respiration sensor 22 may be configured to detect a pressure applied by a part of the driver corresponding to the driver's lung to the front surface of the seatback 12, or to detect a movement of the driver's chest from changes in the electrostatic capacitance of a pair sheet electrodes placed on the front surface of the seatback 12, but other types of respiration sensors may also be used. The pressure sensor 23 consists of a sensor for detecting the driver's posture based on the pressure applied to the seat body 7. The pressure sensor 23 is provided in a planar shape, and is placed on the surface of the seat cushion 11 and the seatback 12 opposing the driver, and detects the posture of the driver by measuring the surface distribution of the pressure (pressure distribution) applied to the seat cushion 11 and the seatback 12 by the driver. The brainwave sensor 24 includes a magnetic sensor provided on a part of the headrest 13 opposing the driver's head to detect a magnetic signal associated with the activity of the driver's brain cells, and obtain the driver's brainwave. By using the alertness level sensor 8 which may consist any of these sensors, it is possible to appropriately detect the driver's alertness level.

The vehicle seat 1 includes a rousing unit 9 that is provided on the seat body 7 to apply a stimulus to the driver to improve the alertness of the driver. The rousing unit 9 includes at least one of a light source 31, a vibration source 32, a sound source 33, a heat source 34, and an electrical stimulus generating source 35 provided on the seat body 7. The light source 31 consists of a device that is provided on the seatback 12 or the headrest 13 to irradiate light onto the driver's head, and may consist of a light such as an LED, for example. The vibration source 32 consists of a device that is provided on the seat cushion 11 or the seatback 12 to transmit vibration to the driver, and may consist of a vibration motor, for example. The sound source 33 consists of a device that is provided on the seat body 7, more preferably on the headrest 13, to emit sound toward the driver, and may consist of a loudspeaker, for example. The heat source 34 consists of a device for heating or cooling a part of the driver's body. In this embodiment, the heat source 34 is a heater or a Peltier device that is provided on the headrest 13 to heat or cool the driver's head. The electrical stimulus generating source 35 is a device including a pair of electrodes provided on the surface of the seat cushion 11 or the seatback 12 opposing the driver and capable of applying a predetermined voltage between the two electrodes so that an electric stimulus may be applied to the driver. By using the light source 31, the vibration source 32, the sound source 33, the heat source 34, and the electrical stimulus generating source 35, a stimulus that urges the driver to be alert can be applied to the driver.

The vehicle seat 1 is provided with a seat control unit 10 which is mounted to the seat body 7 to control the vehicle control device 5, the alertness level sensor 8, and the rousing unit 9. The seat control unit 10 consists of a central processing unit (CPU) that includes memory and a communication port 41, and is provided on the seat body 7, preferably under the seat cushion 11. The seat control unit 10 is configured to communicate with the vehicle control device 5 via a cable that connects the communication port 41 of the seat control unit 10 with the communication port 6 of the vehicle control device 5.

Figure 2:
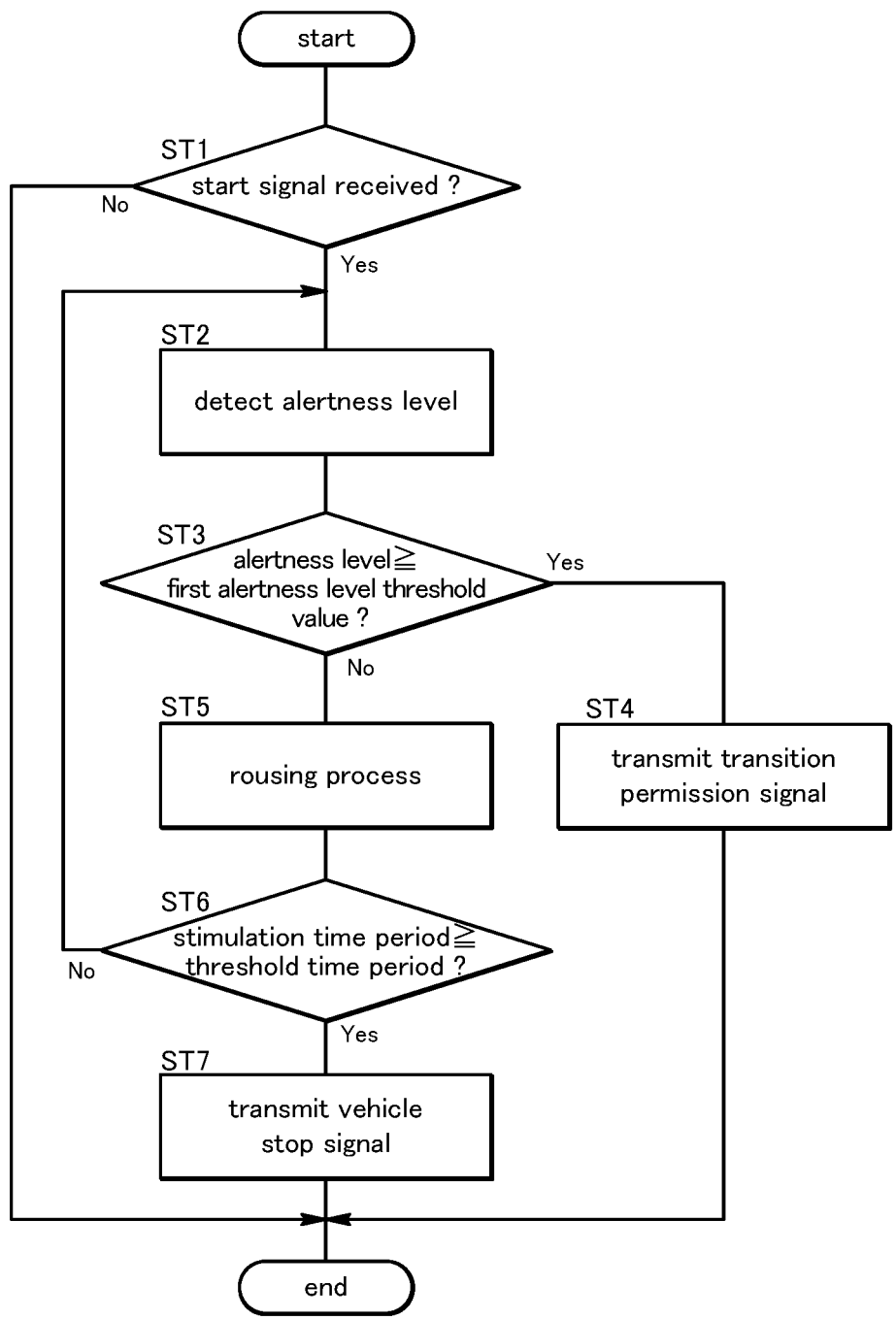
FIG. 2 is a flowchart of a driver monitoring process executed by a seat control unit.
Figure 3:
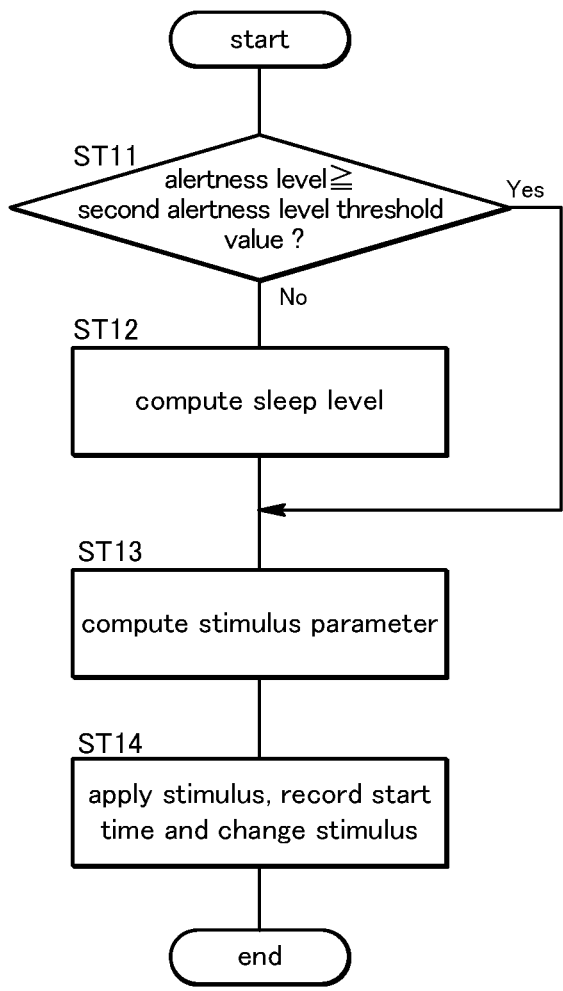
FIG. 3 is a flow chart of the details of a rousing process shown in FIG. 2.

The seat control unit 10 executes a driver monitoring process shown in FIGS. 2 and 3 when the vehicle 3 is in the autonomous driving mode and is about to transition from the autonomous driving to the manual driving. The details of the driver monitoring process are discussed in the following with reference to FIGS. 2 and 3.

In the first step of the driver monitoring process, the seat control unit 10 determines if a start signal has been received from the vehicle control device 5 (step ST1). If the start signal is not received, the driver monitoring process is concluded. At this time, the vehicle 3 is maintained in the autonomous driving mode. When the start signal is received, the program flow advances to step ST2.

In step ST2, the seat control unit 10 detects the driver's alertness level based on the output of the alertness level sensor 8. The alertness level is defined as a numerical value that is zero when the driver is in a deep sleep and increases as the driver's alertness rises. When the alertness level sensor 8 consists of the pulse sensor 21, the driver's heart rate at the start of driving is compared with the heart rate of the driver at the current time so that the seat control unit 10 determines the decrease in the driver's alertness level according to the decrease in the heart rate. When the alertness level sensor 8 consists of the respiration sensor 22, the driver's respiration rate at the start of driving is compared with the respiration rate of the driver at the current time, and the seat control unit 10 determines the decrease in the driver's alertness level according to the decrease in the respiration rate. When the alertness level sensor 8 consists of the pressure sensor 23, the seat control unit 10 may detect the posture of the driver based on the pressure distribution and compute the driver's alertness according to the detected posture. When the alertness level sensor 8 consists of the brainwave sensor 24, the seat control unit 10 may compute the driver's alertness according to the waveform of the detected brainwave of the driver. The seat control unit 10 may determine the alertness level of the driver according to two or more of the heart rate, the respiration rate, the pressure distribution and the brainwave that are detected. Once the seat control unit 10 has detected the alertness level of the driver according to the output(s) of the alertness level sensor 8 such as the heart rate, the respiration rate, the pressure distribution and the brainwave, the seat control unit 10 executes step ST3.

In step ST3, the seat control unit 10 determines if the driver's alertness level is equal to or higher than a first alertness level threshold value. The first alertness level threshold value may be determined as a value of the driver's alertness level when the driver is adequately fit to drive manually. When the alertness level is equal to or higher than the first alertness level threshold value, the seat control unit 10 executes step ST4. When the alertness level is lower than the first alertness level threshold value, the seat control unit 10 executes step ST5.

In step ST4, the seat control unit 10 transmits a transition permission signal to the vehicle control device 5. Upon receiving the transition permission signal, the vehicle control device 5 switches the vehicle 3 from the autonomous driving to the manual driving. At this time, the driver's alertness level is equal to or higher than the first alertness level threshold value, and the driver is sufficiently alert so that the driver can safely drive the vehicle 3 manually.

In step ST5, the seat control unit 10 executes a rousing process. The details of the rousing process is described in the following with reference to FIG. 3.

The seat control unit 10 determines if the alertness level is equal to or higher than a second alertness level threshold as the first step of the rousing process (step ST11). The second alertness level threshold value may be determined as a value of the alertness level of the driver when the driver is in a sleep which may be either a REM sleep or a non-REM sleep. The seat control unit 10 executes step ST13 when the alertness level is equal to or higher than the second alertness level threshold value, and executes step ST12 when the alertness level is lower than the second alertness level threshold value, and the driver is determined to be in sleep.

In step ST12, the seat control unit 10 computes the sleep level indicating the depth of the sleep based on the output (heart rate, respiratory rate, pressure distribution, brainwave, etc.) of the alertness level sensor 8. For example, the sleep level may be 1 in case of a REM sleep and 2 to 5 in case of a non-REM sleep depending on the depth of sleep. When the sleep level is 5, it corresponds to a sleep of deepest kind. Upon completion of the computation of the sleep level, the seat control unit 10 executes step ST13.

In step ST13, the seat control unit 10 determines at least one of the intensity, the time duration, the time cycle, and the timing (stimulation parameters) of the stimulus generated from the rousing unit 9 based on the alertness level and the sleep level that are detected. For example, the seat control unit 10 sets the intensity of the stimulation of the rousing unit 9 (for example, the light source 31) to be inversely proportional to the alertness level, and when the sleep level is equal to or higher than a predetermined value, the stimulus parameters may be set so as to give a stimulus to the driver from another rousing unit 9 (for example, the vibration source 32).

When the setting of the stimulation parameters is completed, the seat control unit 10 drives the rousing unit 9 based on the stimulation parameters and gives the driver a stimulus (step ST14). When the rousing unit 9 is not activated, the seat control unit 10 activates the rousing unit 9 to give a stimulus to the driver, and further records a stimulation start time at which the stimulus is started to be given to the driver. When the rousing unit 9 has already been activated, and the driver has already been given a stimulus, the seat control unit 10 may change the intensity, the time duration, the cyclic time, and timing of the stimulus generated from the rousing unit 9 based on the stimulation parameters as required. Upon completion of the application of the stimulus, the recording of the stimulation start time, and the changing of the stimulus, the seat control unit 10 executes step ST6 of the driver monitoring process shown in FIG. 2.

In step ST6, the seat control unit 10 computes a stimulation time period (a time period during which the driver is stimulated) which is given as the difference between the current time and an alertness recovering time, and determines if the stimulation time period is equal to or greater than a predetermined threshold time period. The threshold time period is set based on the time period required for the driver in sleep to be roused by the rousing unit 9, and is set to about 1 minute in the present embodiment. When the stimulation time period lasts for the threshold time period or more, it can be determined that the driver is not likely to be roused by the rousing unit 9. When the seat control unit 10 determines that the stimulation time period is equal to or greater than the threshold time period, the seat control unit 10 transmits a vehicle stop signal to the vehicle control device 5 (step ST7), and concludes the driver monitoring process. When the stimulation time period is shorter than the threshold time period, the process flow returns to step ST2 to detect the driver's alertness level and perform the rousing process. When the stimulation time period is equal to or longer than the threshold time period, the seat control unit 10 transmits a vehicle stop signal with the result that the vehicle 3 is moved to a safe place and parked therein. Therefore, even when the driver is not going to be roused, the safety of the vehicle 3 can be ensured.

The effect of the vehicle seat 1 according to the first embodiment configured as described above is discussed in the following. In step ST2, the driver's alertness level is detected, and a stimulus that prompts the driver to be roused is given until the alertness level becomes equal to or higher than the first alertness level threshold value. Therefore, when the driver is alert enough to perform the manual driving, the transition permission signal is transmitted to the vehicle control device 5 and the transition to the manual driving is permitted with the result that the transition from the autonomous driving to the manual driving can be performed safely.

Since the transition permission signal is not transmitted to the vehicle control device 5 as long as the alertness level of the driver is lower than the first alertness level threshold value, the transition to the manual driving is prohibited. Therefore, the transition to the manual driving is not performed as long as the driver is not alert enough for the manual driving, whereby the safety of the vehicle 3 can be ensured.

In step ST13, the seat control unit 10 changes the stimulation parameter according to the sleep level. Therefore, even when the driver is in sleep, a stimulus corresponding to the sleep level can be applied to the driver so that the driver can be roused in an appropriate manner.

Second Embodiment

Figure 4:
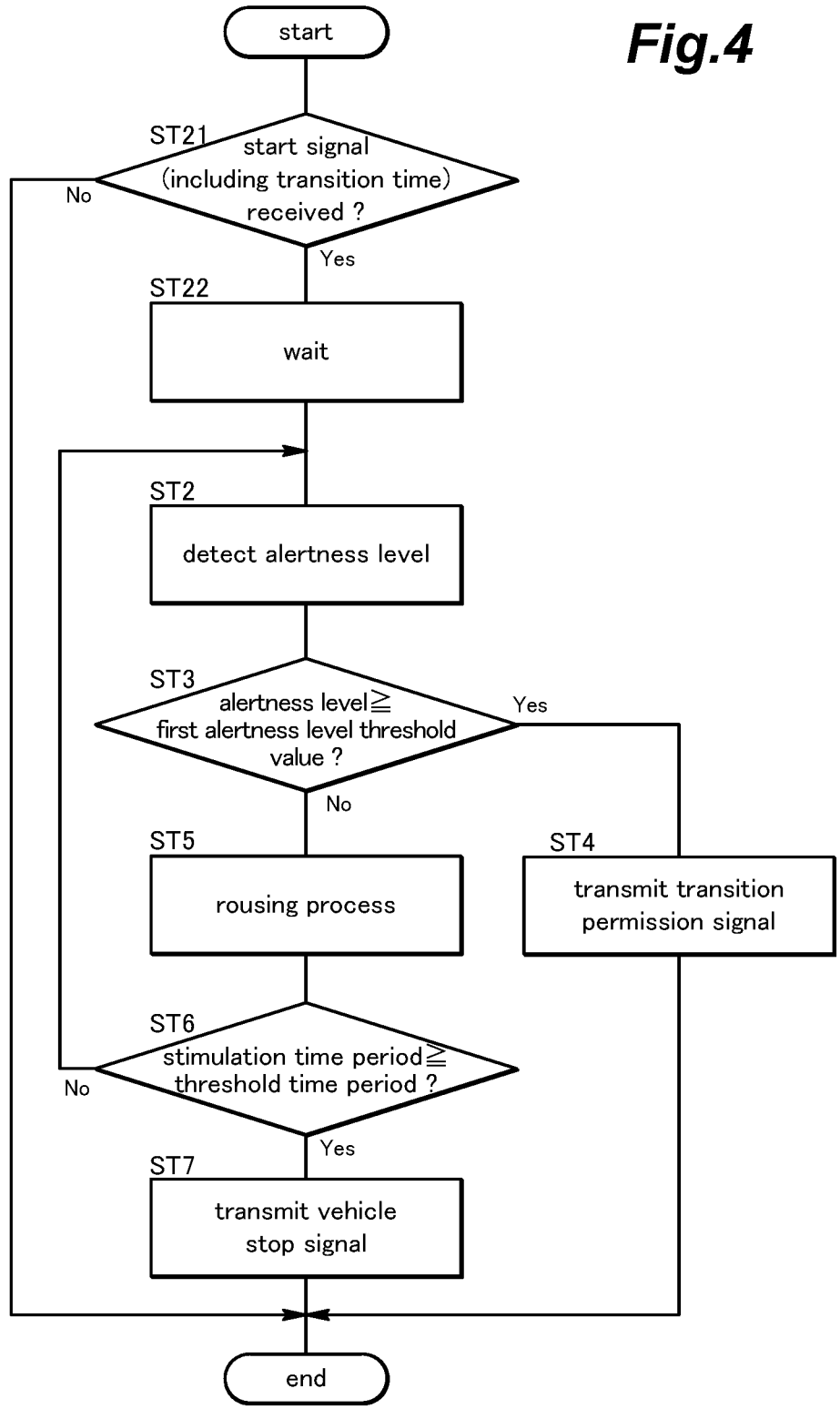
FIG. 4 is a flowchart of a driver monitoring process according to a second embodiment.

The vehicle seat 1 according to the second embodiment differs from the vehicle seat 1 of the first embodiment in that the vehicle control device 5 transmits a start signal including information on the predicted time for the transition from the autonomous driving to the manual driving to the seat control unit 10, and steps ST21 and ST22 are provided in place of step ST1 in the driver monitoring process as shown in FIG. 4.

In step ST21, the seat control unit 10 determines if a start signal including information on the notification or prediction of the time for the transition to the manual driving is received. If the start signal including the information on the predicted time for the transition is not received, the driver monitoring process is concluded. When the start signal including the information on the predicted time for the transition is received, the process flow waits until a time point preceding the time for the transition by a prescribed time period (step ST22). The prescribed time period is set to be longer than the time period required for the driver to become alert enough to perform the manual driving. When the time point preceding the predicted time for the transition by the prescribed time period is reached, the seat control unit 10 executes step ST2 and the subsequent steps, and when the driver's alertness level is equal to or lower than the first alertness level threshold value, a rousing process is executed to apply a stimulus to the driver to urge the driver to be alert.

In the vehicle seat 1 according to the second embodiment, even if a significant time period is required for the driver to be roused, an adequate time period is ensured for the driver to become alert enough before the transition to the manual driving takes place, whereby the driver can be brought to an alertness level suitable for the manual driving in a reliable manner.

Third Embodiment

Figure 5A:
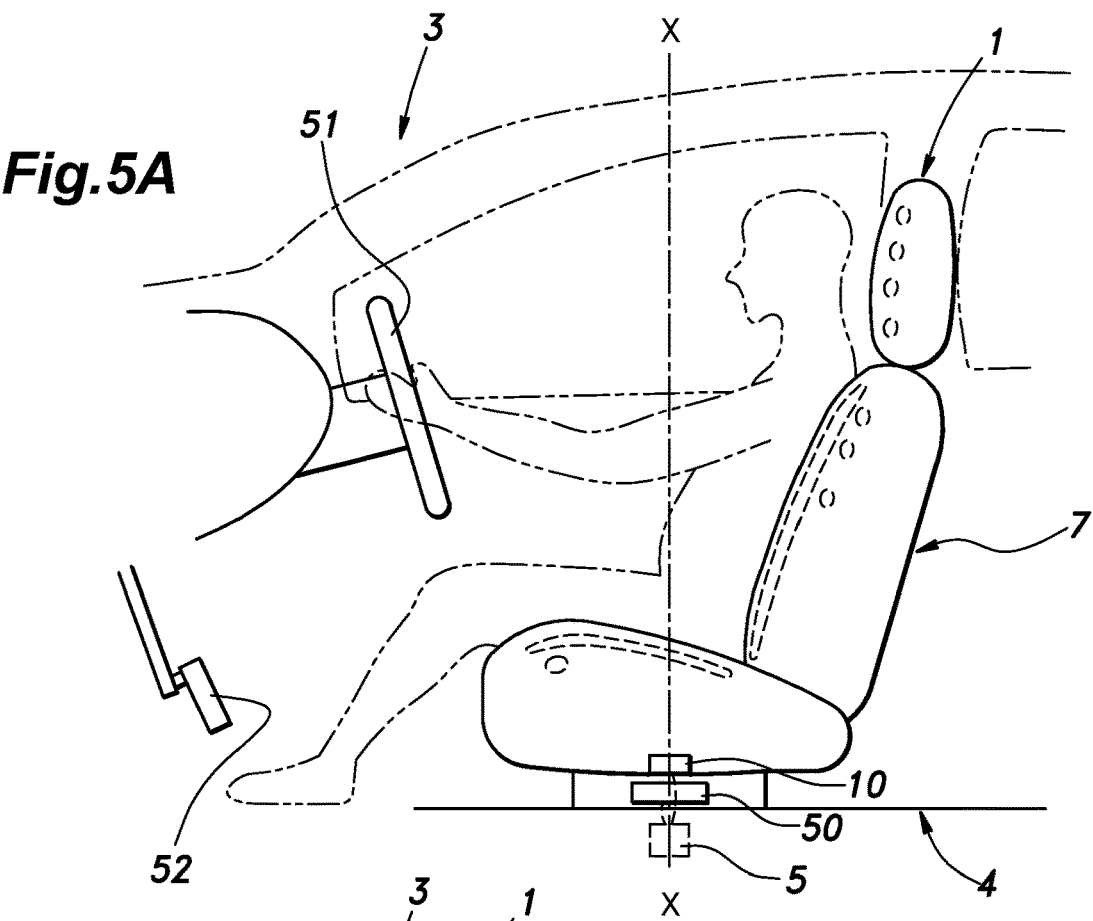
FIGS. 5A and 5B are schematic views of a vehicle seat of a third embodiment in an autonomous driving position and a manual driving position, respectively.
Figure 5B:
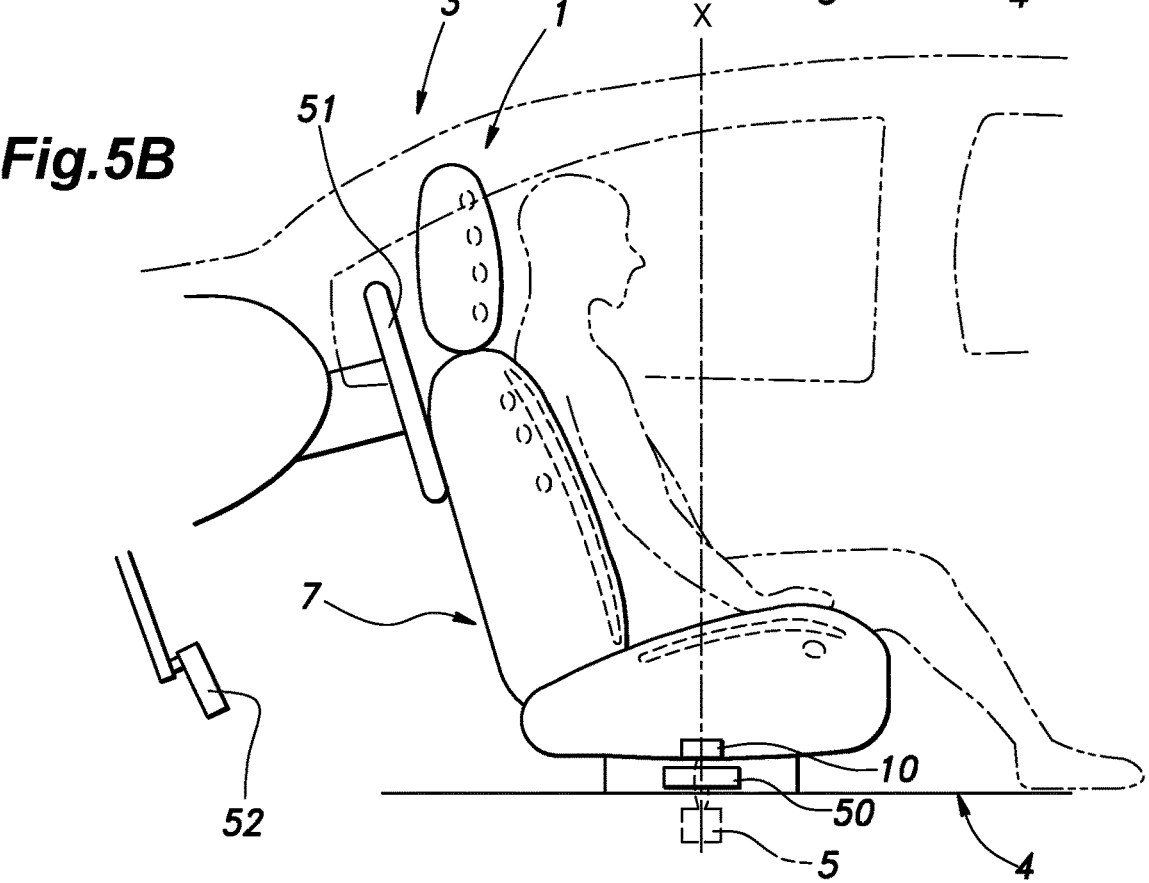

The vehicle seat 1 of the third embodiment differs from the vehicle seat 1 of the second embodiment in that the seat body 7 is moveable with respect to the vehicle body 4, and the rousing unit 9 includes a drive unit 50 configured to move the seat body 7 with respect to the vehicle body 4. As shown in FIGS. 5A and 5B, the seat body 7 is connected to the vehicle body 4 so as to be rotatable about an axial line X extending in a substantially vertical direction between a manual driving position (FIG. 5A) in which the seated driver faces forward and an autonomous driving position (FIG. 5B) in which the seated driver faces backward so as to face the rear seat. When in the manual driving position, the seat body 7 is placed such that the driver can grab the steering wheel 51 in an effortless manner, and the driver's foot can easily reach the pedal 52 which may be an accelerator pedal or the like. The drive unit 50 is provided between the seat body and the vehicle body 4, and by receiving a signal from the seat control unit 10, rotates the seat body 7 about the axial line X with respect to the vehicle body 4 to move the seat body 7 between the autonomous driving position and the manual driving position.

In the present embodiment, both the vehicle control device 5 and the seat control unit 10 are provided along the axial line X. By arranging in this way, the stress applied to the wiring connecting the vehicle control device 5 to the seat control unit 10 due to the rotation of the seat body 7 can be minimized.

In the third embodiment, the seat control unit 10 causes the drive unit 50 to move the seat body 7 from the autonomous driving position to the manual driving position in the rousing process in step ST5 of the driver monitoring process. The rotation of the seat body 7 gives the driver a stimulus so as to urge the driver to be alert.

In the vehicle seat 1 according to the third embodiment, during the autonomous traveling, the seat body 7 can be moved to a position which allows the occupants to face each other so that a relaxing space can be created in the vehicle. Furthermore, when switching to the manual driving, the seat body 7 is moved to a position suitable for the manual driving so that the driver can receive a stimulus that urges the driver to be alert. For this reason, when switching to the manual driving, the operation to rouse the driver and the movement of the seat body 7 can be performed at the same time so that a separate operation for stimulating the driver to be alert is not required.

Fourth Embodiment

Figure 6:
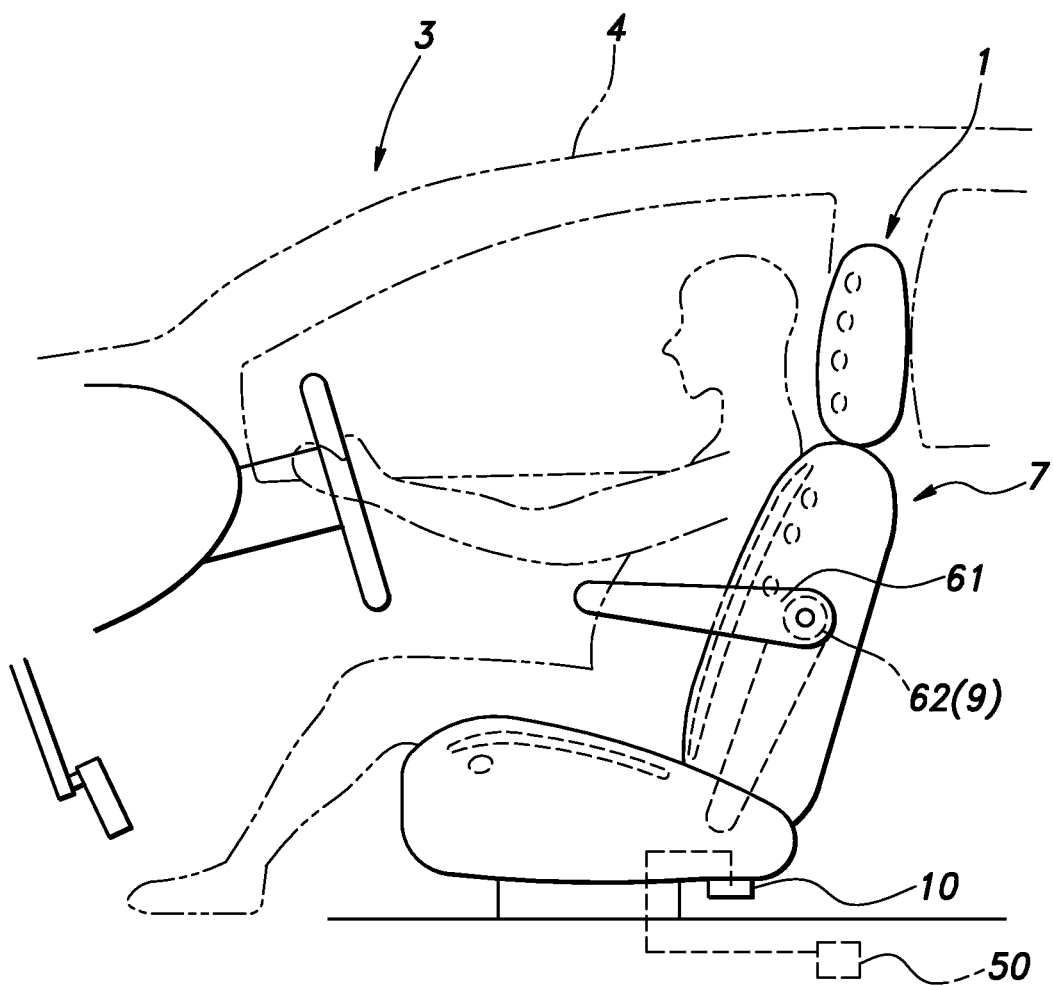
FIG. 6 is a schematic view of the positioning of an armrest of a fourth embodiment in a raised position (solid lines) and a lowered position (broken lines).

The seat body 7 of the vehicle seat 1 according to the fourth embodiment is provided with an armrest 61 which is attached to an inboard side wall of the seatback 12 at one end thereof so as to be rotatable around a laterally extending axial line with respect to the seat body 7, as shown in FIG. 6. Furthermore, an armrest control unit 62 is provided between the seatback 12 and the armrest 61 so as to control the rotation of the armrest 61 relative to the seatback 12. The armrest control unit 62 is connected to the seat control unit 10, and is configured to move the armrest 61 between a raised position (solid line) extending forward and a lowered position (broken line) extending downward by receiving a prescribed signal. When the armrest 61 is in the raised position, the driver's arm can be placed on the armrest 61, and therefore, the seat body 7 is considered to be in the manual driving position suitable for the manual driving. On the other hand, when the armrest 61 is in the lowered position, the driver can freely move the arm so that the seat body 7 is considered to be in the autonomous driving position suitable for the autonomous driving.

In the fourth embodiment, the seat control unit 10 causes the armrest control unit 62 to move the armrest 61 from the lowered position to the raised position in the rousing process in step ST5 of the driver monitoring process. Owing to the movement of the armrest 61, the seat body 7 transitions from the autonomous driving position to the manual driving position, and the driver is given a stimulus to be alert. Therefore, the movement of the armrest 61 and the rousing of the driver can be performed at the same time.

The present invention has been described in terms of specific embodiments, but the present invention is not limited by such embodiments, and various modifications are possible. The alertness level of the driver was detected by using the alertness level sensor 8 in the foregoing embodiments, but other forms of biometric sensors for detecting the fatigue level, body condition, etc. of the driver may also be used, instead of the alertness level sensor 8, so that the stimulus to be given to the driver may be varied depending on the fatigue level, body condition, etc. of the driver. It may be also possible to arrange such that a vehicle stop signal is issued when an abnormal cardiovascular condition such as a cardiac arrest of the driver is detected. In such a case, the seat control unit 10 may be configured to control the electrical stimulus generating source 35 so as to provide a suitable electric stimulus for the driver's heart to beat with a proper rhythm.

In the foregoing embodiments, the seat control unit 10 was provided in the seat body 7, but the present invention is not limited by such embodiments. For instance, the seat control unit 10 may be provided on the vehicle body 4 integrally with the vehicle control device 5.

In the fourth embodiment, the armrest 61 was rotatably connected to the seatback 12, but the present invention is not limited by this embodiment, and any other forms of armrest 61 can be used as long as the armrest 61 is movably connected to the seatback 12.

Glossary of Terms

| | |
|---|---|
| 1: vehicle seat | 2: driver |
| 3: vehicle | 4: vehicle body |
| 5: vehicle control device | 7: seat body |
| 8: alertness level sensor | 9: rousing unit |
| 10: seat control unit | 21: pulse sensor |
| 22: respiration sensor | 23: pressure sensor |
| 24: brainwave sensor | 31: light source |
| 32: vibration source | 33: sound source |
| 34: heat source | 35: electrical stimulus generating source |
| 50: drive unit | 61: armrest |
| 62: armrest control unit | |

The invention claimed is:

1. A vehicle seat configured to be mounted on a vehicle provided with a vehicle control device that can be selectively switched from autonomous driving to manual driving, comprising:
   a seat body configured to support a driver;
   a seat control unit configured to communicate with the vehicle control device;
   an alertness level sensor provided on the seat body for detecting an alertness level of the driver, and
   a rousing unit provided on the seat body for providing a stimulus for urging the driver to be roused;
   wherein the seat control unit is configured to detect the alertness level of the driver according to a signal from the alertness level sensor upon receiving a start signal that is produced by the vehicle control device when a transition from the autonomous driving to the manual driving is to be initiated, to activate the rousing unit when the alertness level is lower than a first alertness level threshold value, and to permit the vehicle control device to perform the transition from the autonomous driving to the manual driving when the alertness level is equal to or higher than the first alertness level threshold value thereof, and
   wherein the seat body is provided with a seat cushion that supports the driver's buttocks and thighs and a seatback that supports the driver's back, the alertness level sensor comprises a respiration sensor to detect a movement of the driver's chest from changes in the electrostatic capacitance of a pair sheet electrodes placed on the front surface of the seatback, and the seat control unit detects the alertness level of the driver according to the movement of the driver's chest detected by the respiration sensor.

2. The vehicle seat according to claim 1, wherein the alertness level sensor comprises the respiration sensor configured to detect a pressure applied by a part of the driver corresponding to the driver's lung, and the seat control unit detects the alertness level of the driver according to the movement of the driver's chest and the pressure detected by the respiration sensor.

3. The vehicle seat according to claim 1, wherein the alertness level sensor further includes a brainwave sensor, the brainwave sensor includes a magnetic sensor provided on a part of the headrest opposing the driver's head to detect a magnetic signal associated with the activity of the driver's brain cells, and obtain the driver's brainwave, and the seat control unit detects the alertness level of the driver according to the movement of the driver's chest and the driver's brainwave obtained by the brainwave sensor.

4. The vehicle seat according to claim 1, wherein the seat control unit is configured to change at least one of an intensity, a time duration, a cyclic period and a timing of the stimulus in dependence on the alertness level.

5. The vehicle seat according to claim 1, wherein the seat control unit is configured to compute a sleep level of the driver including a distinction between a REM sleep and a non-REM sleep based on an output from the alertness level sensor when the alertness level is lower than a second alertness level threshold value which is lower than the first alertness level threshold value, and to change the stimulus provided to the driver according to the computed sleep level.

6. The vehicle seat according to claim 1, wherein the seat control unit is configured to receive a signal predicting a time of the transition from the autonomous driving to the manual driving from the vehicle control device, and to activate the rousing unit in advance of the predicted time of the transition by a prescribed time period.

7. The vehicle seat according to claim 1, wherein the rousing unit includes at least one of a light source configured to irradiate light to the driver, a vibration source configured to provide vibration to the driver, a sound source configured to generate sound, a heat source configured to heat or cool at least a part of the driver's body, and an electrical stimulus generating source configured to apply an electrical stimulus to the driver.

8. A vehicle seat configured to be mounted on a vehicle provided with a vehicle control device that can be selectively switched from autonomous driving to manual driving, comprising:
   a seat body configured to support a driver,
   a seat control unit configured to communicate with the vehicle control device;
   an alertness level sensor provided on the seat body for detecting an alertness level of the driver, and
   a rousing unit provided on the seat body for providing a stimulus for urging the driver to be roused;
   wherein the seat control unit is configured to detect the alertness level of the driver according to a signal from the alertness level sensor upon receiving a start signal that is produced by the vehicle control device when a transition from the autonomous driving to the manual driving is to be initiated, to activate the rousing unit when the alertness level is lower than a first alertness level threshold value, and to permit the vehicle control device to perform the transition from the autonomous driving to the manual driving when the alertness level is equal to or higher than the first alertness level threshold value thereof,
   wherein the drive unit is provided between the seat body and the vehicle body, and by receiving a signal from the seat control unit, rotates the seat body with respect to the vehicle body thereof,
   wherein the seat body at the autonomous driving position can be at a rotated position which allows the occupants to face each other thereof,
   wherein the seat body at the manual driving position is relative to the vehicle body to face forward thereof,
   wherein the rousing unit causes the drive unit to rotate the seat body via the seat control unit for providing a stimulus for urging the driver when the seat body at the autonomous driving position is at the rotated position thereof, and
   wherein the seat body is provided with a seat cushion that supports the driver's buttocks and thighs and a seatback that supports the driver's back, the alertness level sensor comprises a respiration sensor to detect a movement of the driver's chest from changes in the electrostatic capacitance of a pair sheet electrodes placed on a front surface of the seatback, and the seat control unit detects the alertness level of the driver according to the movement of the driver's chest detected by the respiration sensor.

9. The vehicle seat according to claim 8, further including an armrest which is moveable relative to the seat body, the rousing unit causing the armrest to move as the stimulus.

10. The vehicle seat according to claim 8, wherein both the vehicle control device and the seat control unit are provided along the rotation axial line of the seat body.

\* \* \* \* \*